United States Patent
Autery et al.

(10) Patent No.: US 7,171,827 B2
(45) Date of Patent: Feb. 6, 2007

(54) SYSTEM AND METHOD FOR AUTOMATED CASTING OF INFRARED GLASS OPTICAL COMPONENTS

(75) Inventors: William David Autery, Richardson, TX (US); Gregory Stewart Tyber, Allen, TX (US); Donald Bryan Christian, Allen, TX (US); Allan Leroy Buehler, Garland, TX (US); Athanasios John Syllaios, Richardson, TX (US)

(73) Assignee: Umicore SA, Brussels (BE)

( * ) Notice: Subject to any disclaimer, the term of this patent is extended or adjusted under 35 U.S.C. 154(b) by 434 days.

(21) Appl. No.: 10/417,026

(22) Filed: Apr. 15, 2003

(65) Prior Publication Data
US 2004/0206122 A1 Oct. 21, 2004

(51) Int. Cl.
C03B 5/42 (2006.01)

(52) U.S. Cl. .............. 65/32.5; 65/83; 65/66; 65/157; 65/319

(58) Field of Classification Search .......... 65/32.1, 65/32.5, 66, 135.6, 157, 308, 319
See application file for complete search history.

(56) References Cited

U.S. PATENT DOCUMENTS

| | | | | |
|---|---|---|---|---|
| 2,306,789 A | * | 12/1942 | McNamara | 65/29.16 |
| 2,804,378 A | | 8/1957 | Upton | |
| 2,871,624 A | | 2/1959 | Upton | |
| 2,887,359 A | * | 5/1959 | Gans | 423/509 |
| 3,209,641 A | | 10/1965 | Upton | |
| 3,214,241 A | * | 10/1965 | Forber et al. | 501/40 |
| 3,451,794 A | * | 6/1969 | Patterson | 65/32.5 |
| 3,656,924 A | | 4/1972 | Chapman et al. | |
| 3,663,192 A | | 5/1972 | Perry | |
| 3,743,492 A | * | 7/1973 | Ogita | 65/32.5 |
| 3,773,529 A | * | 11/1973 | Plumat | 501/40 |
| 3,883,340 A | * | 5/1975 | French et al. | 65/135.3 |
| 4,542,108 A | | 9/1985 | Susman et al. | |

(Continued)

FOREIGN PATENT DOCUMENTS

DE 296427 A5 7/1990

(Continued)

OTHER PUBLICATIONS

"*Technique Developed for Fluoride Glass Windows*", NTIS Tech Notes, US Department of Commerce, Springfield, VA, US, p. 949, XP000279261, ISSN: 0889-8464 (1 page), Dec. 1, 1991.

(Continued)

Primary Examiner—Sean Vincent
(74) Attorney, Agent, or Firm—O'Keefe, Egan & Peterman, LLP

(57) ABSTRACT

In accordance with the present invention, a system and method for the automated casting of infrared glass optical components is provided. The system includes a mold for casting infrared glass into lenses, a mold chamber operable to heat the mold to a temperature above the melting temperature of the infrared glass, and a casting chamber operable to fill the mold with molten infrared glass. The method includes heating a mold in a mold chamber to a temperature above the melting temperature of infrared glass, casting molten infrared glass into the mold in a casting chamber; and cooling the mold to a temperature below the glass transition temperature of the infrared glass.

33 Claims, 8 Drawing Sheets

U.S. PATENT DOCUMENTS

| | | | |
|---|---|---|---|
| 4,747,864 A | | 5/1988 | Hagerty et al. |
| 4,778,505 A | * | 10/1988 | Hirota et al. .................. 65/102 |
| 5,098,460 A | * | 3/1992 | Omi et al. ..................... 65/21.1 |
| 5,171,347 A | * | 12/1992 | Monji et al. .................... 65/64 |
| 5,173,100 A | * | 12/1992 | Shigyo et al. ................. 65/102 |
| 5,273,567 A | | 12/1993 | Richards ....................... 65/134 |
| 5,329,406 A | | 7/1994 | Nakanishi et al. ........... 359/811 |
| 5,346,523 A | | 9/1994 | Sugai et al. ................... 65/102 |
| 5,766,294 A | * | 6/1998 | Takagi et al. ................. 65/102 |
| 6,634,189 B1 | * | 10/2003 | Hudgens et al. .............. 65/389 |
| 6,668,588 B1 | * | 12/2003 | Hilton et al. ................... 65/37 |
| 6,800,574 B2 | * | 10/2004 | Anderson ...................... 501/33 |
| 2003/0007203 A1 | | 1/2003 | Amon et al. ................... 359/19 |
| 2003/0029332 A1 | | 2/2003 | Matsuzuki et al. ............ 100/92 |
| 2004/0040837 A1 | * | 3/2004 | McTeer et al. ........ 204/192.26 |
| 2004/0079114 A1 | * | 4/2004 | Aitken et al. ................... 65/64 |
| 2004/0141241 A1 | * | 7/2004 | Claytor ........................ 359/742 |
| 2004/0206119 A1 | * | 10/2004 | Syllaios et al. ............. 65/29.21 |
| 2004/0206121 A1 | * | 10/2004 | Autery et al. ................... 65/83 |
| 2004/0206122 A1 | * | 10/2004 | Autery et al. ................... 65/83 |

FOREIGN PATENT DOCUMENTS

| | | |
|---|---|---|
| EP | 0250091 A1 | 12/1987 |
| EP | 0378292 A1 | 7/1990 |
| JP | 62059534 | 3/1987 |
| JP | 01157424 | 6/1989 |
| JP | 01290537 | 11/1989 |
| JP | 03131537 | 6/1991 |
| JP | 05132325 | 5/1993 |
| JP | 05345622 | 12/1993 |
| JP | 06024766 | 2/1994 |
| JP | 06092652 | 4/1994 |
| JP | 08188424 | 7/1996 |
| JP | 2002128533 | 5/2002 |
| JP | 2002187727 | 7/2002 |
| WO | WO 02/30837 A2 | 4/2002 |

OTHER PUBLICATIONS

Reeves et al, "Overpressure Processing Of Ag-Sheathed Bi-2212 Tapes", IEEE Transactions On Applied Superconductivity, vol. 7, No. 2, Jun. 1997; pp. 1541-1543.

Derwent 1992-151539; Derwent Week; 199219; corresponding to Patent DD296427A having Publication Date: Dec. 5, 1991; 3 pgs.

* cited by examiner

SYSTEM AND METHOD FOR AUTOMATED CASTING OF INFRARED GLASS OPTICAL COMPONENTS

GOVERNMENT CONTRACT

Under the terms of the Dual Use Applications Program (DUAP) Contract No. DAAB07-98-3-J002 awarded by the U.S. Army Communications-Electronics Command (CE-COM), the United States Government may have certain rights in this invention.

TECHNICAL FIELD OF THE INVENTION

The present invention relates in general to the field of optics and, in particular, to a system and method for the automated casting of infrared glass optical components.

BACKGROUND OF THE INVENTION

Chalcogenide glasses, those containing one or more of the chalcogenide elements sulfur, selenium, or tellurium, are used in a variety of optical applications. Because of their excellent infrared transmittal properties and relatively low production costs, these glasses, especially selenium-based glasses, are commonly used in infrared optical systems, such as thermal imaging and night vision systems.

Currently, most chalcogenide glasses are produced as small boules in sealed quartz reaction containers. This helps minimize the loss of selenium, which is prone to evaporate out of the reaction melt during the glass formation reaction due to its relatively high vapor pressure. However, production processes such as these suffer from high production costs due to the consumption of the quartz reaction containers, long production times, and environmental risks due to possible explosions.

Once the glass is formed, any practical optical application requires that the glass be formed into an optical component, such as a lens. Current production processes for such optics rely mainly on grinding or molding the chalcogenide glass into lenses. These, however, are rather lengthy processes. After the glass is formed from its constituent elements in a quartz reaction container, the glass is cast into a plate and annealed, so as to avoid breakage. The annealed plate is then cut into blanks, which are ground to thickness, edged, and turned or ground into lenses or formed into lenses in a vacuum press. This process can take several days to complete. Furthermore, production volumes are constrained by the size of the mold ovens used to produce the lenses.

The production of chalcogenide lenses is also hampered by the molds used to form the lenses. Molds typically used for such molding are relatively complex, having a large number of parts and requiring measuring and shimming each time the molds are disassembled for cleaning. Because of their high part count, the tolerance stack-up for each mold prevents molds from being built with acceptable tolerances for high yield processes. Furthermore, reassembly of the molds adds much variability to the part tolerance stack-up, as well.

The molds also suffer from a variety of mechanical problems, as various mold components fail due to the high temperatures they are exposed to during casting and molding. Often times threaded fasteners employed in the molds fail or gall at high temperatures. Furthermore, galling and friction with the mold guide pins frequently lead to mold closing failures.

SUMMARY OF THE INVENTION

In accordance with the present invention, a system and method for the automated casting of infrared glass optical components is provided. The system comprises a mold for casting infrared glass into lenses, a mold chamber operable to heat the mold to a temperature near the transition temperature of the infrared glass, a melt chamber operable to melt the IR glass or react/synthesize the glass, and a casting chamber operable to fill the mold with molten infrared glass. The method comprises heating a mold in a mold chamber to a temperature near the transition temperature of infrared glass, casting molten infrared glass into the mold in a casting chamber; and cooling the mold to a temperature below the glass transition temperature of the infrared glass.

A technical advantage of particular embodiments of the present invention includes the ability to produce infrared glass lenses from their raw elements in one automated system, reducing overall production costs, cycle times, and labor requirements.

Another technical advantage of particular embodiments of the present invention is the ability to load, evacuate, and heat the mold chamber and casting chamber independently due to the use of a pressure isolation valve between the two chambers.

Yet another technical advantage of particular embodiments of the present invention is the hot-walled construction of the mold and casting chambers, allowing for uniform heating, longer heater life, and minimum volatile condensation on the walls of the chambers.

Other technical advantages will be readily apparent to one skilled in the art from the following figures, descriptions and claims. Moreover, while specific advantages have been enumerated above, various embodiments may include all, some, or none of the enumerated advantages.

BRIEF DESCRIPTION OF THE DRAWINGS

For a more complete understanding of the invention, and for further features and advantages, reference is now made to the following description, taken in conjunction with the accompanying drawings, in which.

DETAILED DESCRIPTION OF THE DRAWINGS

Figure 1:
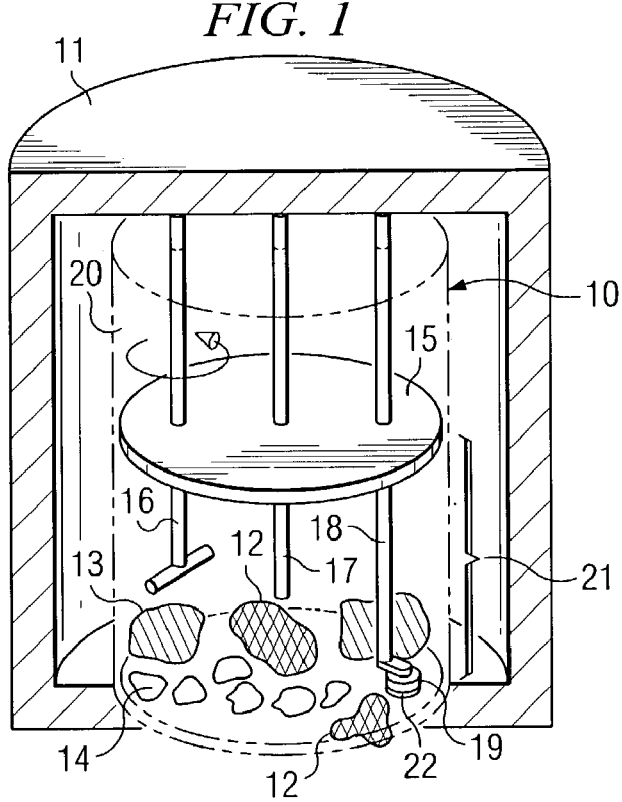
FIG. 1 illustrates an apparatus for forming chalcogenide glass from its constituent elements.

FIG. 1 illustrates an apparatus that accommodates a method for vapor pressure controlled growth of chalcogenide glass, in accordance with a particular embodiment of the present invention. Chalcogenide glasses formed using the apparatus and techniques described herein may be used to form optical components that may be used in many fields, for example, infrared imaging. Such chalcogenide glasses are compounded from their elemental constituents by reacting them to a molten state and quenching the resultant melt to below its glass transition temperature.

With respect to ternary and quaternary glasses based upon selenium, such as Ge—Sb—Se and/or Ge—Sn—Sb—Se, care must be taken to minimize selenium loss due to evaporation. In accordance with the present invention, one or more of five controlling factors may be used to minimize selenium loss: overpressure, melt surface baffling, a hot-wall reaction vessel, heat balance control during phase changes, and reaction control by mixing rate control. Other methods to minimize selenium loss may also be used within the teachings of the present invention.

In FIG. 1, chalcogenide glass is formed in reaction container 10, which is housed within externally heated, hot wall reaction chamber 11. Typically reaction container 10 is constructed of quartz. However, other suitable materials, such as ceramics or pyrolytic graphite could be used as well. Within reaction container 10, selenium, germanium, and antimony are reacted to form a ternary chalcogenide glass. These constituent elements are represented in FIG. 1 by Se piece 14, Sb piece 13, and Ge piece 12. Although not shown, tin could also be added to form a quaternary glass.

These constituents, referred to collectively as reaction melt 21, are mixed by stirring rod 16 within reaction container 10. In accordance with a particular embodiment of the present invention, the temperature of reaction melt 21 may be monitored by melt thermocouple 17, or by other methods such as an optical pyrometer or by fluorescence decay optical sensors.

In addition to providing adequate mixing, stirring rod 16 is also used to control the rate of reaction within the reaction melt 21. During glass formation, several temperature spikes are developed in response to the evolved heat of reaction. As these spikes are detected by melt thermocouple 17, the rotation rate of stirring rod 16 is reduced by an appropriate amount to arrest the rate of the temperature increase.

Particular embodiments of the reaction container also feature valve arm 18. Valve arm 18 features a wing-type or shear-type valve device. Unlike a ball-type valve, which could introduce air pockets to the molten glass, a wing-type or shear-type valve slides from side-to-side to open and close the valve. This prevents the introduction of air pockets and facilitates precision metering of glass. Furthermore, as valve arm 18 couples with reaction container 10 to seal valve 19 against hole 22, the valve arm 18, valve seat 19, and reaction container 10 are typically constructed from similar materials to minimize thermal expansion effects, and valve seal 19 and the surface surrounding the hole 22 are ground flat and smooth to function as a liquid tight seal.

As mentioned above, a variety of measures are taken to reduce the loss of selenium or other volatile constituents out of reaction melt 21 due to evaporation, in various embodiments of the present invention. One such measure is the maintenance of an overpressure of at least one atmosphere over reaction melt 21 in space 20. In a particular embodiment, this is accomplished by introducing an inert gas, such as nitrogen, helium, or argon, into reaction container 10 and maintaining a pressure higher than the vapor pressure of the most volatile constituent. In this embodiment, the most volatile constituent is selenium.

The mass transfer of selenium (or other volatile constituents) may also be controlled at the surface of reaction melt 21 by mass boundary layer 15. Similar to a liquid encapsulation reaction (LER), mass boundary layer 15 affects molecular streaming, diffusion, and convection over the reaction melt 21, serving as a physical barrier to the transfer of selenium out of reaction melt 21. One method of establishing such a layer is by introducing a non-reactive material, such as boron oxide ($B_2O_3$), that has a melting point lower than the boiling point of selenium and a density lower than that of selenium.

Another method is to introduce quartz plates over the reaction melt 21, either floating on the melt surface or placed at the top of reaction container 10.

Another method for minimizing selenium loss employed by particular embodiments of the reaction apparatus is the use of hot-wall reaction chamber 11. The use of hot-wall reaction chamber 11 allows the glass formation to take place under isothermal conditions and prevents the walls of reaction chamber 11 from serving as condensation areas for selenium vapors that escape from reaction melt 21. Reaction chamber 11 can also be lined with materials that are chemically inert to selenium, including a nickel-chromium-iron alloy, such as Inconel®, to prevent selenium loss due to any reactions with the walls of reaction chamber 11 that could form metal selenides. In addition, reaction chamber 11 may be externally heated, prolonging heater life and reducing production costs.

Figure 12:
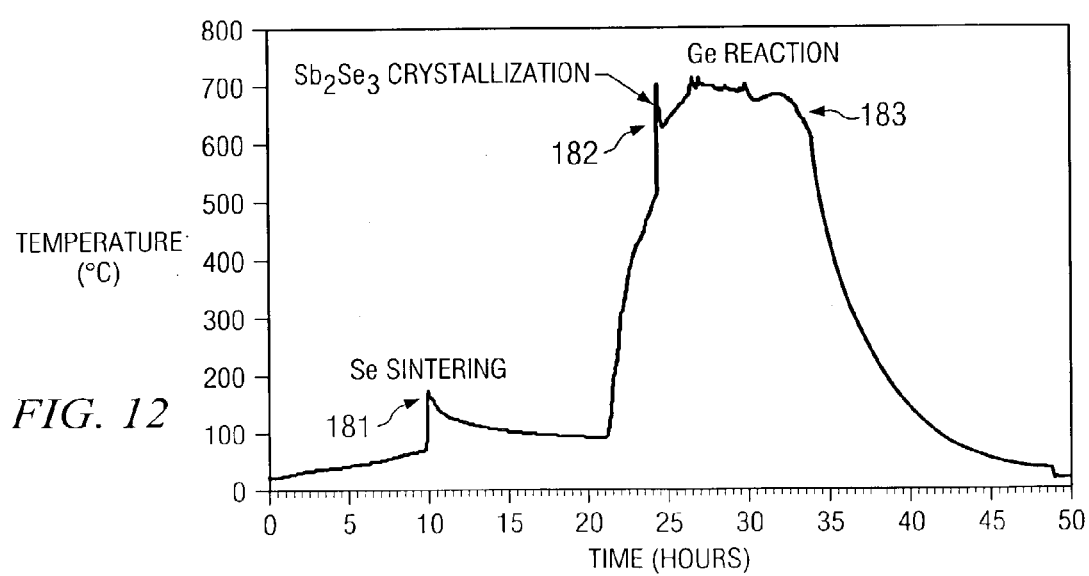
FIG. 12 illustrates the temperature evolution typical during a chalcogenide glass reaction.

Yet another way selenium loss is minimized in particular embodiments of the reaction apparatus is by using heat balance control during phase changes within reaction melt 21. As mentioned earlier, there are various exothermic effects during glass formation that result in abrupt temperature increases. FIG. 12 illustrates the temperature evolution typical during chalcogenide glass manufacturing, including two distinct temperature spikes 181 and 182 followed by a series of smaller temperature spikes 183. The first of these temperature spikes, spike 181, at approximately 70° C. and 2 atm, is due at least in part to selenium sintering. The next spike, spike 182, at approximately 500° C. and 2 atm, is due at least in part to the latent heat of crystallization of a solid compound (probably antimony selenide ($Sb_2Se_3$)) formed prior to glass formation. Finally, a series of smaller spikes 183 around 700° C. and 2 atm are due at least in part to the heat of reaction of Ge with the rest of the elements in reaction melt 21. The temperature of reaction melt 21 is adjusted in response to each of these temperature spikes 181–183, by adjusting the power to the heaters heating reaction chamber 11 using specific algorithms for each temperature profile. In this way, these exothermic heats of reaction are used to propel the various steps of the chalcogenide glass reaction, while minimizing the possibility of having a potentially disastrous runaway reaction develop.

First, the selenium sintering temperature spike, spike 181, is exploited to increase the heating rate and bring the temperature quickly above the selenium melting point.

The crystallization temperature spike, spike 182, is detected by monitoring the time derivative of the temperature reported by melt thermocouple 17 near the temperature at which the spike begins (approximately 500° C. at 2 atm). During the upward temperature surge, the heater power is reduced. The size of the temperature spike 182 is also reduced by using large pieces of Sb, thus presenting a smaller reaction interface to the Se melt (larger pieces have less surface area per volume than smaller pieces). This is illustrated in FIG. 1 by the disparate sizes of Se piece 14 and Sb piece 13.

Once the temperature begins to fall after temperature spike 182, the heater power is restored to remelt the solidified material. Complete remelting is then detected by monitoring the rotation of and/or torque applied to stirring rod 16. When stirring rod 16 rotates freely inside reaction melt 21, its rotation rate is increased to a maximum value to mix reaction melt 21 and promote the glass formation reaction.

In response to the small temperature spikes due to the heat of reaction of Ge with the rest of the elements in reaction melt 21, spikes 183, the mixing rate of stirring rod 16 is also adjusted. As these temperature spikes 183 are detected by melt thermocouple 17, the rotation rate of stirring rod 16 is reduced by an appropriate amount to at least partially arrest the rapid temperature increase.

Once the glass formation reaction is complete and no more temperature ripples are observed, the heater power is reduced and reaction melt 21 is brought down to an acceptable pouring temperature (i.e., a temperature where the glass is easily poured yet does not splatter). After reaction melt 21 has adequately cooled, valve arm 18 is released, pouring the liquid glass through valve 19 where it is allowed to continue to cool. Pouring the glass into another container at a lower temperature facilitates a rapid temperature change, thus quenching the material.

Various chalcogenide glasses can be made using an apparatus such as that described in FIG. 1. Two such glasses are $Ge_{12}Sn_7Sb_{13}Se_{68}$ (LCG111) and $Ge_{28}Sb_{12}Se_{68}$ (TI 1173). The compositions for these two glasses are given in the following table.

| | $Ge_{12}Sn_7Sb_{13}Se_{68}$ (LCG111) Glass Composition | | $Ge_{28}Sb_{12}Se_{60}$ (TI 1173) Glass Composition | |
|---|---|---|---|---|
| Element | Mole % | Weight % | Mole % | Weight % |
| Ge | 12 | 10 | 28 | 24.7 |
| Sn | 7 | 9.6 | — | — |
| Sb | 13 | 18.3 | 12 | 17.7 |
| Se | 68 | 62.1 | 60 | 57.6 |

In reacting these constituents to form a chalcogenide glass, the elemental constituents are loaded into a quartz reaction container. Typically, the constituents are layered in the reaction container from top to bottom as follows: Sb, Se, Ge, Se, and Sn (if applicable). Notice that the layer of Ge is disposed between two layers of Se, the two layers dividing between them the total weight of selenium in the reaction melt.

The constituent layers are comprised of various size particles, depending on the elemental constituent. These particle sizes, as well as the amount of each elemental constituents used in each layer in both 5 kg and 10 kg batches, are shown in the table below.

| | | $Ge_{12}Sn_7Sb_{13}Se_{68}$ (LCG111) | | $Ge_{28}Sb_{12}Se_{60}$ (TI 1173) | |
|---|---|---|---|---|---|
| Element | Piece Size | 5 kg Batch | 10 kg Batch | 5 kg Batch | 10 kg Batch |
| Sb | 1" × 2" Chunks | 914 g | 1828 g | 1234.5 g | 2469 g |
| Se | Shot | 1601 g | 3202 g | 1489 g | 2978 g |
| Ge | 1" × ½" Chunks | 503 g | 1006 g | 887.5 g | 1775 g |
| Se | Shot | 1601 g | 3202 g | 1489 g | 2978 g |
| Sn | Shot | 480 g | 960 g | — | — |

Of course, these tables, and their associated descriptions herein, are provided for illustration and example only. Other chalcogenide glasses have different compositions and reaction conditions. It will be recognized by those of ordinary skill in the art that various techniques may be employed in implementing the process disclosed herein, varying with glass compositions and reaction conditions.

Figure 2:
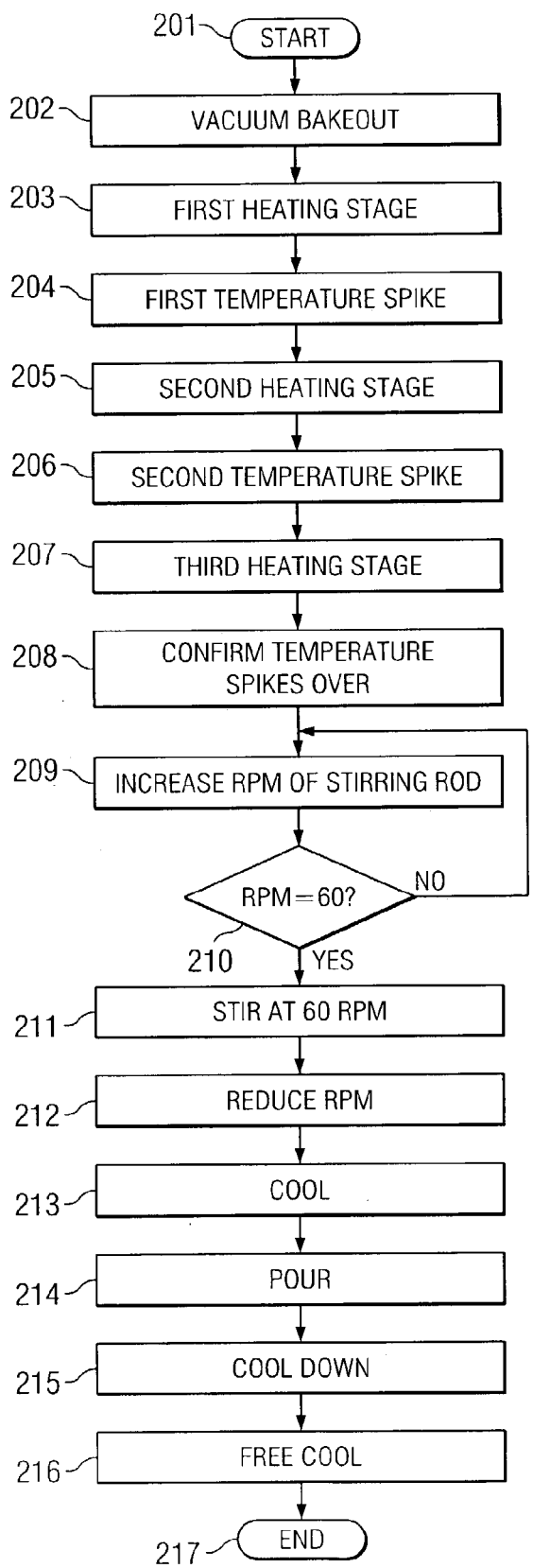
FIG. 2 illustrates a flowchart of the process of forming chalcogenide glass from its constituent elements.

An example of how an apparatus such as that shown in FIG. 1 is operated is provided by FIG. 2, which illustrates a flowchart of a process for making one type of chalcogenide glass, LCG111.

This process begins with a vacuum bakeout in block 202. In the vacuum bakeout, the walls of the reaction chamber are heated to a predetermined temperature set point, such as 100° C., and the chamber is pumped down to a vacuum, such as a pressure of 100 mTorr or less. This process may be aided by conducting multiple pump and nitrogen backfills, which help to reduce the amount of oxygen and water vapor in the chamber.

Once the temperature indicated by the melt thermocouple is sufficiently warm (e.g., in this example 60° C.), a first heating stage is started in block 203. In this first heating stage, the chamber wall temperature is set to temperature sufficient to initiate Se sintering, and the nitrogen pressure is set to provide an overpressure of at least one atmosphere. In this example, a wall temperature set point of 250° C. and a nitrogen pressure set point of approximately 1520 Torr (or 2 atm) are used. These conditions are maintained for 150 minutes, until the first exothermic reaction temperature spike, due to Se sintering, is detected in block 204.

After the first temperature spike, a second heating stage begins in block 205. In this second heating stage the reaction chamber set point is set to a temperature sufficient to initiate the $Sb_2Se_3$ crystallization reaction, such as 580° C., which results in a second temperature spike (due to the $Sb_2Se_3$ crystallization) in block 206.

After the second temperature spike is detected, the reaction chamber set point is set a temperature sufficient to initiate the Ge reaction in a third heating stage in block 207. In this example, 725° C. is used.

Block 208 then confirms that the temperature spikes are complete. This assurance is provided when the melt temperature has reached 675° C., or some other predetermined temperature near the desired temperature set point, and the melt thermocouple ramp rate is sufficiently low, such as less than 1.0° C./min.

The reaction melt is then mixed with a stirring rod to assure adequate mixing. Mixing is controlled by adjusting the rotation rate of the stirring rod. At high rotation rates the glass reaction rate may be too high, resulting in an increase in the temperature of the reaction melt due to the exothermic heat of reaction. This could potentially increase the Se vapor pressure, resulting in substantial Se loss. Therefore, the mixing rate is closely controlled.

As part of this close control, the stirring rate is slowly increased in block 209 (e.g., 1 RPM every 5 minutes), but only if the melt ramp rate is still sufficiently low, such as less than 1.1° C./min, and only if the melt thermocouple doesn't indicate a significant temperature increase (e.g., the melt temperature stays below 700° C.). This is done until the stirring rate reaches 60 RPM in block 210.

Once block 210 confirms that the stirring rod has reached 60 RPM, the reaction melt is stirred at 60 RPM for 120 minutes in block 211. After 120 minutes, the stirring rod is slowed to 20 RPM in block 212 by reducing the stirring rate 1 RPM every 10 seconds until a stirring rate of 20 RPM is achieved.

The reaction chamber set point is then set to 0° C. in block 213. Once the melt temperature approaches the appropriate pour temperature (e.g., within 20° C. of the pour temperature), the mixture is allowed to further cool for a specified time, for example 5 minutes, while being stirred to ensure its homogeneity, before it is poured in block 214. For LCG111, the appropriate pour temperature is 560° C., but, of course, this temperature is composition dependent. To prevent crystallization, and at the same time allow the melt to flow and fill the receiving container, the glass may be poured into a heated mold or tray, which in this example is kept at a temperature of approximately 250° C. Otherwise, the glass may simply be poured into any shape of interest.

Following pouring, the process continues to cooldown in block 215. During this time the reaction chamber set point remains at room temperature and the pressure set point remains at 1520 Torr. These conditions are maintained for approximately 60 minutes. After approximately 60 minutes, the material may be slow cooled using heater power to minimize stress as the glass cools through the glass transition temperature, after that all contactors are turned off, and the glass is allowed to free cool in block 216, before the process terminates in block 217.

FIG. 2, and its associated descriptions herein, are provided for illustration and example only. Other chalcogenide glass formation reactions may have different temperature profiles and require different reaction conditions. It will be recognized by those of ordinary skill in the art that various techniques may be employed in implementing the process disclosed herein, varying with glass compositions and reaction conditions.

Figure 3:
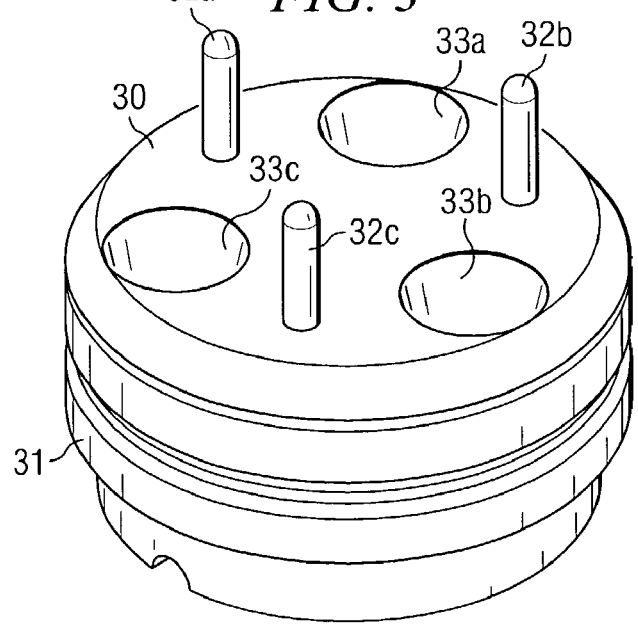
FIG. 3 illustrates an isometric view of a mold assembly used for casting chalcogenide lenses.

Once the chalcogenide glass has been formed, the glass may be cast, molded, or machined into shape. FIG. 3 illustrates an isometric view of a mold assembly used for the casting or molding of chalcogenide optical components. Casting typically involves pouring liquid glass into a mold, and molding typically involves placing a sold perform into the mold. This mold assembly comprises mold halves 30 and 31. Each mold half 30 and 31 defines the shape of one face of a lens. A taper and shoulder on each mold half (not visible in this isometric view) provide precise control of centering and perpendicularity of the two mold halves 30 and 31. The mold assembly also includes three pins 32a–32c and springs (not illustrated in this isometric view), which are operable to hold the mold open for casting.

Figure 4:
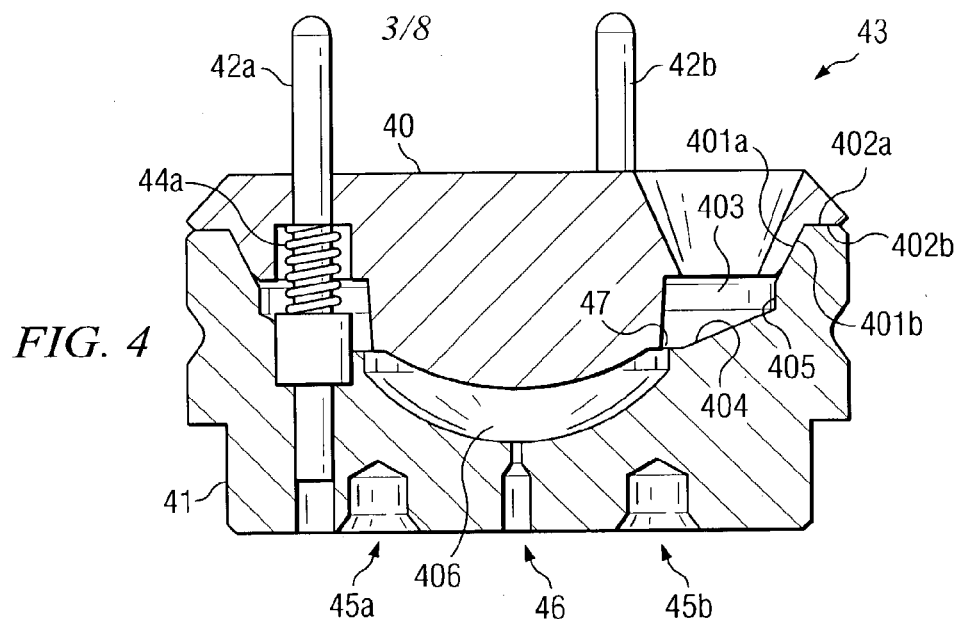
FIG. 4 illustrates a cut-away view of a mold assembly used for casting chalcogenide lenses.

FIG. 4, which illustrates a cut-away view of a mold assembly similar to the one shown in FIG. 3, provides a better understanding of the design of the mold assembly. Like the mold illustrated in FIG. 3, the mold assembly illustrated in FIG. 4 is comprised of two mold halves 40 and 41. Mold halves 40 and 41 are configured to be removably coupled such that a first face of mold half 40 and a second face of mold half 41 form an interface that defines a lens-shaped cavity 406. In this way, mold halves 40 and 41 define the shape of a lens, which is typically described by mathematical equations, each mold half 40 or 41 corresponding to one face of the lens.

To provide precise control of the centering and perpendicularity, mold halves 40 and 41 also feature circumferential tapers 401a and 401b and shoulders 402a and 402b that mate to properly align the mold halves 40 and 41. Tapers 401a and 401b ensure proper optical alignment for centering, while shoulders 402a and 402b ensure the perpendicularity of the lenses formed. Unless properly centered and perpendicular, the lenses produced by the molds will have limited uses in optical applications. Therefore, tapers 401a and 401b and shoulders 402a and 402b assure proper lens geometry by controlling centering and perpendicularity when the mold closes.

The mold assembly also features a circumferential, shaped reservoir 403 located between lens-shaped cavity 406 and tapers 401a and 401b. This shaped reservoir 403 prevents the flow of molten glass from lens-shaped cavity 406 back into the locating tapers 401a and 401b, and yet allows enough glass to be dispensed into the mold assembly to ensure that the mold is adequately filled. Reservoir 403 also features vertical surface 405, which further helps to prevent molten glass from flowing into the locating tapers 401a and 401b by presenting a surface that is more difficult to climb (relative to the tapered surface 404 located below).

Located at the base of circumferential reservoir 403, between the reservoir 403 and the lens-shaped cavity 406 is flash gap 47. As the name implies, flash gap 47 is a small gap between the area of the mold assembly that forms the lens and circumferential reservoir 403. This gap allows molten glass to flow from lens-shaped cavity 406 up into reservoir 403. Flash gap 47 also helps provide an edge detail on the lens formed by the mold assembly. As flash gap 47 provides only a narrow passage way between the lens face of the mold and reservoir 403, upon cooling, the glass in flash gap 47 suffers a stress fracture along the gap. This leaves an edge detail on the lens formed by the mold assembly. This edge detail can be useful in the mounting of the lens.

The mold assembly also features a plurality of pins and springs located between the two mold halves 40 and 41, operable to hold the mold halves open for casting. These are illustrated by pins 42a and 42b, and spring 44a coupled with pin 42a (additional springs and pins may be included, but are not illustrated in this figure). In FIG. 1, pin 42a and spring 44a are shown sitting within a pocket within reservoir 403; however, in other embodiments, the pins and springs may be located elsewhere between mold halves 40 and 41. Typically, three sets of pins and springs are used, as three pins and springs provide a determinate structural arrangement. Additional or fewer pins and springs could be used. However, for most operations, a determinate number of pins and springs is usually desirable.

Mold half 40 also features plurality of inlet holes, illustrated by inlet hole 43. Although not illustrated in this figure, other inlet holes may also be included (see inlet holes 33a–33c in FIG. 3). Although not required for lens molding, this feature may be used as an inlet to the mold when casting lenses. In fact, although having only one inlet hole may be adequate to fill the mold, additional inlet holes located symmetrically around mold half 40 may provide the added benefit of yielding a weight balanced mold.

As shown in FIG. 4, inlet hole 43 feeds directly in reservoir 403. When glass is poured through inlet hole 43, the glass falls on tapered ramp 404, which makes up part of the reservoir 403. Pouring onto this tapered surface helps prevent the molten chalcogenide glass from splattering when it comes in contact with mold half 41.

FIG. 4 also shows vent hole 46 located in mold half 41. Although not required for casting, vent hole 46 accommodates the venting of air when the mold is used in a puck molding process. This prevents the accumulation of air pockets on the face of a lens that is being formed. Although vent hole 46 is shown located in mold half 41, additional or alternate vent holes could be located in mold half 40, as well, depending on the geometry of the lens being formed by the mold assembly.

Mold half 41 also features a plurality of mold handling holes, illustrated by mold handling holes 45a and 45b (other mold handling holes may be included, but are not illustrated). These shallow pin holes allow for the automated handling of the mold assembly, especially under high temperature conditions. Mold handling holes 45a and 45b could also accommodate a thermocouple, in addition to serving a mold handling purpose.

The two-piece mold design described above offers several technical advantages. One such advantage is that it uses far fewer parts than previous molds. Some previous molds used as many as 92 different parts. The two-piece design significantly lowers that part count.

Another technical advantage of particular embodiments of the mold is the ability to machine all the critical surfaces of the mold, including the lens faces, lens edges, taper, and shoulder in one setup of a diamond point turning (DPT) lathe. This results in the ability to control the centering and perpendicularity of the lens without any appreciable tolerance stack-up.

The simple tooling is also easy to disassemble and clean in an aqueous system. Furthermore, the lack of any blind, small, or trapped holes prevents the trapping of fluid during cleaning. The design also does not require the use of fasteners, which could fail after several high temperature process cycles.

Additionally, the two-piece design is also smaller and lighter than previous molds, resulting in a mold having less thermal mass.

However, to take advantage of these benefits and yet consistently produce quality lenses, the construction material of the mold assembly must be chosen carefully. As the chalcogenide lens and mold expand and contract as they are heated and cooled, it is important to select a mold material that has a coefficient of thermal expansion similar to that of the chalcogenide glass being formed. Otherwise, as the lens and mold expand and contract at different rates, the lens could potentially be damaged. One example of such a mold material that has an acceptable coefficient of thermal expansion is hardened 420 stainless steel. As liquid chalcogenide glass can erode tool steel up to ⅛ inch deep in one casting cycle, the hardened 420 stainless steel mold may be coated with a surface coating that can protect the mold surfaces, and yet not degrade the optical surfaces of the lens. An example of such a coating that works well with hardened 420 stainless steel is titanium nitride (TiN). Additional protection may be supplied by coating the mold with a mold release compound, such as Kisscote 1086™.

Of course, even with these materials, it is still typical in the molding and casting of lenses to cast a lens with a slightly different shape than that which is ultimately desired. This is done to compensate for shrinkage and distortion of the lens as it cools so that the ultimate product, has the exact optical qualities desired.

A clamp assembly may also be added to the mold assembly to hold the mold open for casting and closed for molding. Such a clamp assembly is illustrated in FIGS. 5A–6B. Although not instrumental to the mold, the above mentioned pins and springs, along with such clamp assembly are designed to allow fully automated disassembly, cleaning and reassembly of the mold.

Figure 5A:
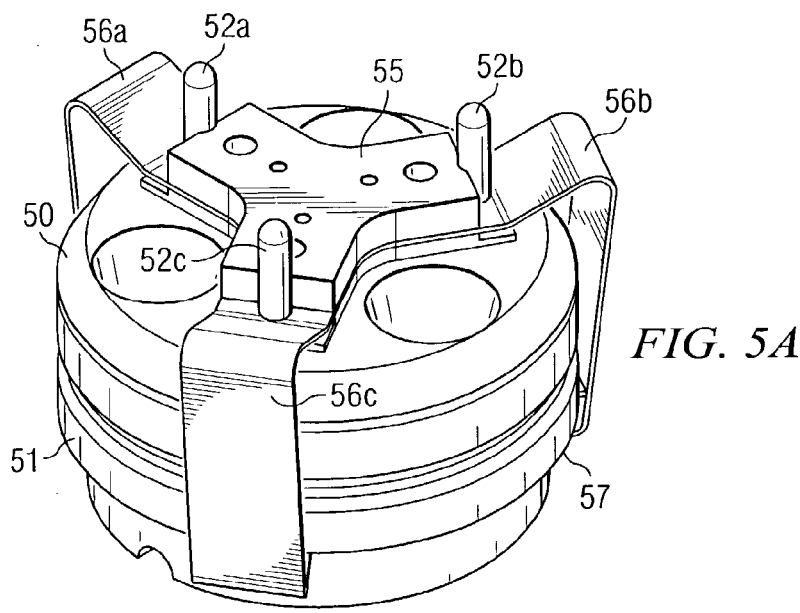
FIG. 5A illustrates an isometric view of a mold and clamp assembly used for casting chalcogenide lenses that is in the closed position.

FIG. 5A illustrates an isometric view of a mold and clamp assembly that is used for casting chalcogenide lenses. This mold is comprised of mold halves 50 and 51. Clamp assembly 55, comprising clamp assembly arms 56a–56c, is operable to hold mold halves 50 and 51 closed. This is accomplished by clamp assembly arms 56a–56c, which extend down the sides of mold halves 50 and 51, and lock in place on lip 57 on mold half 51. In this position, clamp assembly 55 compresses the springs along pins 52a–52c, holding mold halves 50 and 51 together. In this closed position arms 56a–56c are preloaded to overcome springs 44a–44c and keep the mold halves together after the press operation. In this way, arms 56a–56c press down on mold halves 50 and 51 from above. A side view of this assembly is shown in FIG. 5B.

Figure 5B:
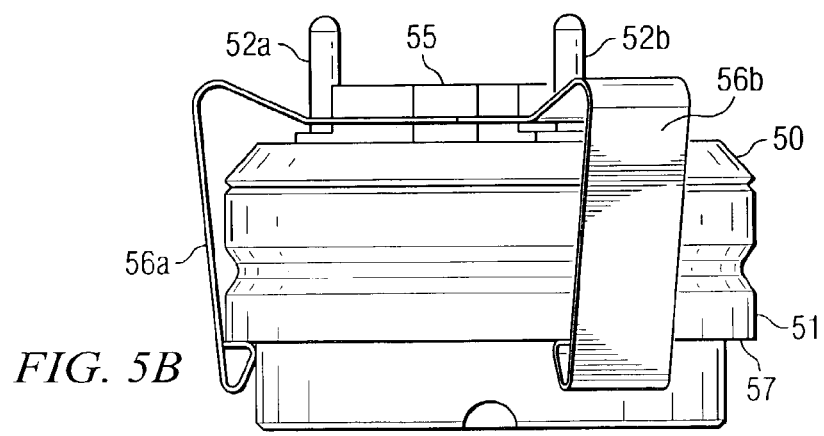
FIG. 5B illustrates a side view of a mold and clamp assembly used for casting chalcogenide lenses that is in the closed position.
Figure 6A:
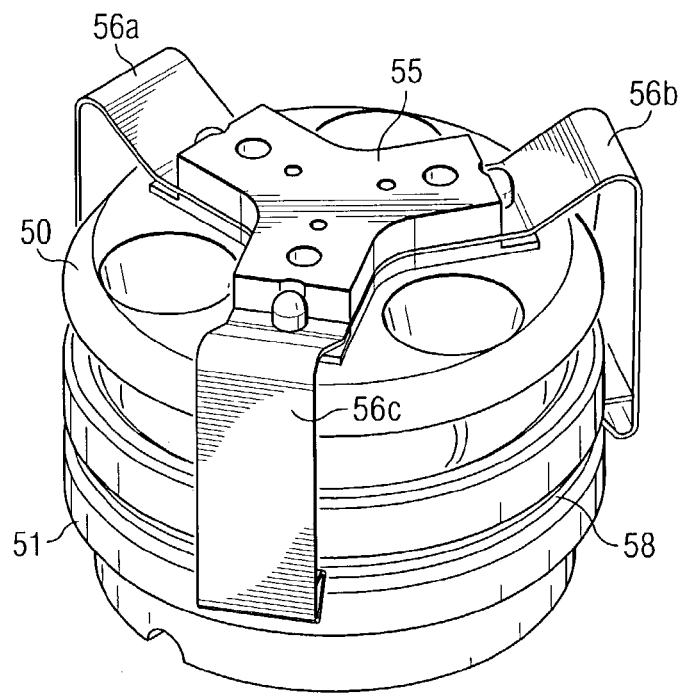
FIG. 6A illustrates an isometric view of a mold and clamp assembly used for casting chalcogenide lenses that is in the open position.
Figure 6B:
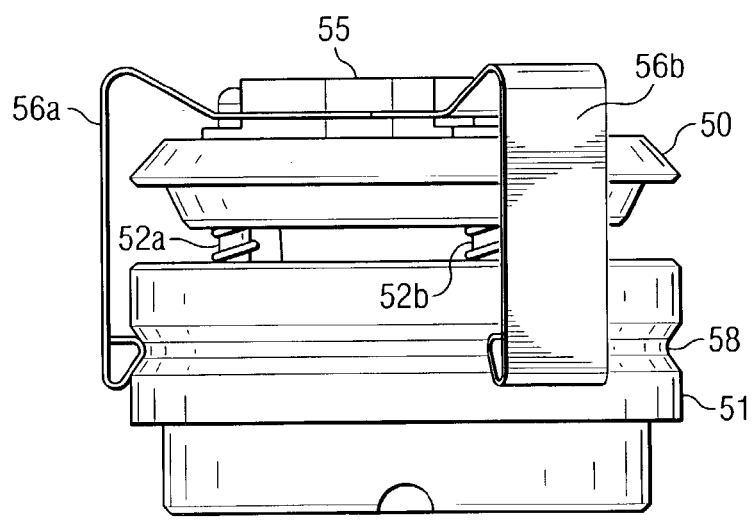
FIG. 6B illustrates a side view of a mold and clamp assembly used for casting chalcogenide lenses that is in the open position.

FIGS. 6A–6B illustrate the same mold and clamp assembly shown in FIG. 5A–5B. However, the mold illustrated in FIGS. 6A–6B is in the open position.

FIG. 6A illustrates an isometric view of the mold assembly comprised of mold halves 50 and 51 and clamp assembly 55. In this figure, clamp assembly 55, rather than holding mold halves 50 and 51 together in the closed position, holds mold halves 50 and 51 apart in the open position. In this open position, clamp assembly arms 56a–56c extend down the sides of mold halves 50 and 51, locking in place in grove 58 in the side of mold half 51. In this position the springs along pins 52a–52c are allowed to expand, forcing apart mold halves 50 and 51. A side view of this open mold and clamp assembly is shown in FIG. 6B.

One technical advantage of molds such as those illustrated in FIGS. 3–6B is that they may be used in an automated casting system, allowing for greater automation of the chalcogenide lens production process and larger production runs.

Figure 7:
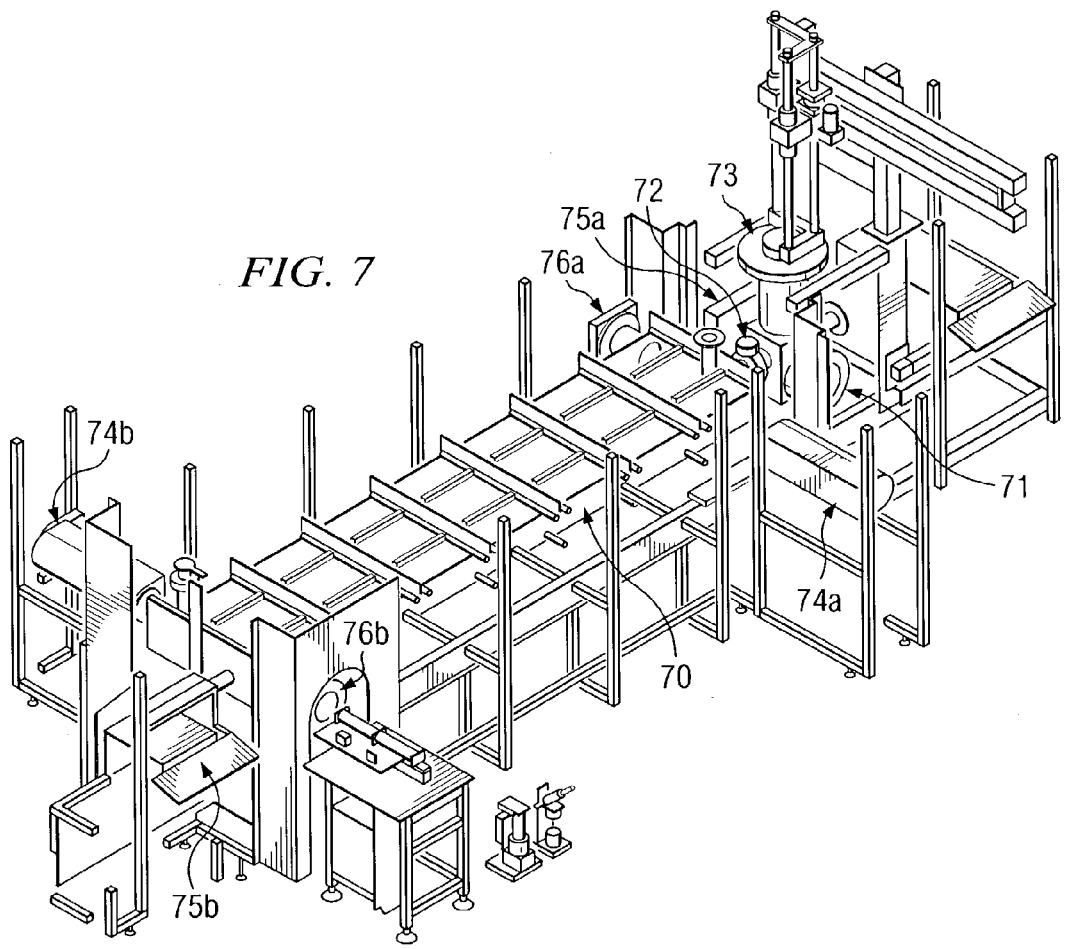
FIG. 7 illustrates an isometric view of an automated system for casting chalcogenide lenses.

FIG. 7 illustrates an isometric view of such an automated casting system for casting chalcogenide lenses. This automated casting system is comprised of two main sections, mold chamber 70 and casting chamber 71. Inside mold chamber 70, empty molds are heated to a temperature above the melting temperature of the chalcogenide glass. The empty molds are then transferred to casting chamber 71, where liquid chalcogenide glass is cast into the molds. After being filled with glass, the molds are returned to mold chamber 70, where the molds are pressed closed and allowed to cool. By isolating casting chamber 71 from mold chamber 70, the possibility of a casting failure ruining a large batch of lenses or damaging mold chamber 70 is greatly reduced.

The construction of mold chamber 70 and casting chamber 71 also offers several benefits. Both mold chamber 70 and casting chamber 71 feature a hot wall construction. This results in a lower thermal mass, uniform heating, longer heater life, and minimum volatile condensation on the interior walls of mold chamber 70 and casting chamber 71. The construction of mold chamber 70 is also easily scalable, which allows the capacity of the automated casting system to be increased by simply increasing the length of mold chamber 70.

Separating mold chamber 70 and casting chamber 71 is pressure isolation valve 72. Separating mold chamber 70 and casting chamber 71 with pressure isolation valve 72 allows the two chambers to be loaded, evacuated, and heated independently. During casting, however, pressure isolation valve 72 is open, allowing molds to be moved from mold chamber 70 to casting chamber 71 to be filled with liquid chalcogenide glass.

Molds are loaded into mold chamber 70 through loading stations 76b. Once inside mold chamber 70, the molds are moved through the chamber in a closed loop. This is accomplished by mold pushers 74a–75b. Mold pushers 74a and 74b work in concert to move the molds in one plane, while mold pushers 75a and 75b work in concert to move the molds in another, perpendicular plane.

FIG. 7 also illustrates melt chamber 73. This chamber is similar to the apparatus for forming chalcogenide glass shown in FIG. 1. Integrating melt chamber 73 into the automated casting system allows more of the production of chalcogenide lenses to be combined into one machine, where the constituent elements of chalcogenide glass are loaded into the automated casting system and chalcogenide lenses are output. This is known as a "rocks in, lenses out" process, where the automated system reacts chalcogenide glass, homogenizes the glass, transfers the glass into molds, presses the lenses to shape, and anneals the glass. Although not essential to the automated casting system, this integration allows greater optimization of production requirements. In a non-integrated process, melt chamber 73 could instead be loaded with pre-reacted chalcogenide glass to be cast into molds in casting chamber 71.

Figure 8:
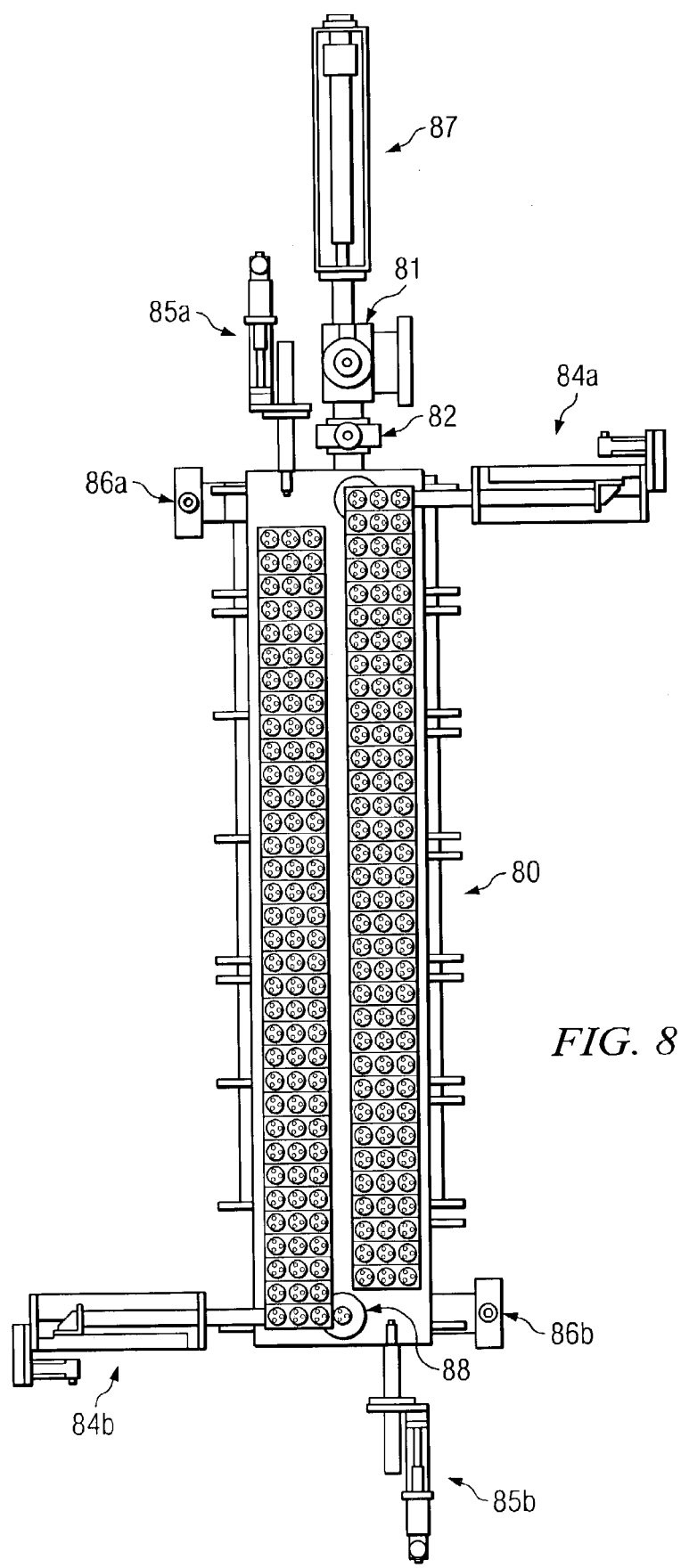
FIG. 8 illustrates a top view of an automated system for casting chalcogenide lenses.

A better understanding of the operation of the automated casting system is available from FIG. 8, which illustrates a cut-away, top view of an automated casting system similar to that shown in FIG. 7.

The automated casting system shown in FIG. 8 is comprised of mold chamber 80 and casting chamber 81. These two chambers are separated by pressure isolation valve 82.

Open molds are loaded in mold chamber 80 on 3-by-1 trays through loading stations 86b. As with the molds, the choice of a tray material is also important (though to a lesser extent), as the trays tend to gall and degrade after repeated exposure to the extreme temperatures inside the mold chamber. Therefore, the trays are constructed of a material able to withstand repeated exposure to these temperatures without prematurely degrading. One such material that has proven adequate for this purpose is H13, a hardenable stainless steel alloy, although other materials may be used as well.

Once the trays of molds are loaded into the mold chamber, the trays are then moved counter-clockwise through mold chamber 80 by mold pushers 84a–85b. Mold pushers 84a–84b work in concert to move the trays in one plane, while mold pushers 85a–85b work in concert to move the trays in another, perpendicular plane. Although other mechanisms, such as belts, rollers, or walking beams, may be used to move the molds within the mold chamber, the four-point pusher system of mold pushers 84a–85b offers the added benefits of reduced costs and enhanced scalability.

Once the molds reach the end of mold chamber 80 adjacent to casting chamber 81, transport arm 87 reaches through casting chamber 81 and pressure isolation valve 82 to grab a single mold. This mold is then brought back through pressure isolation valve 82 into casting chamber 81, where it is filled with liquid chalcogenide glass. Once filled, the mold is then returned to its tray inside mold chamber 80.

After casting, the molds continue to move in the closed loop in mold chamber 80. At the end of mold chamber 80 opposite casting chamber 81, the filled molds are closed by mold press 88. The molds continue along the closed loop until all molds are closed. Once close, the molds are allowed to cool until they are cool enough to be removed.

Figure 9:
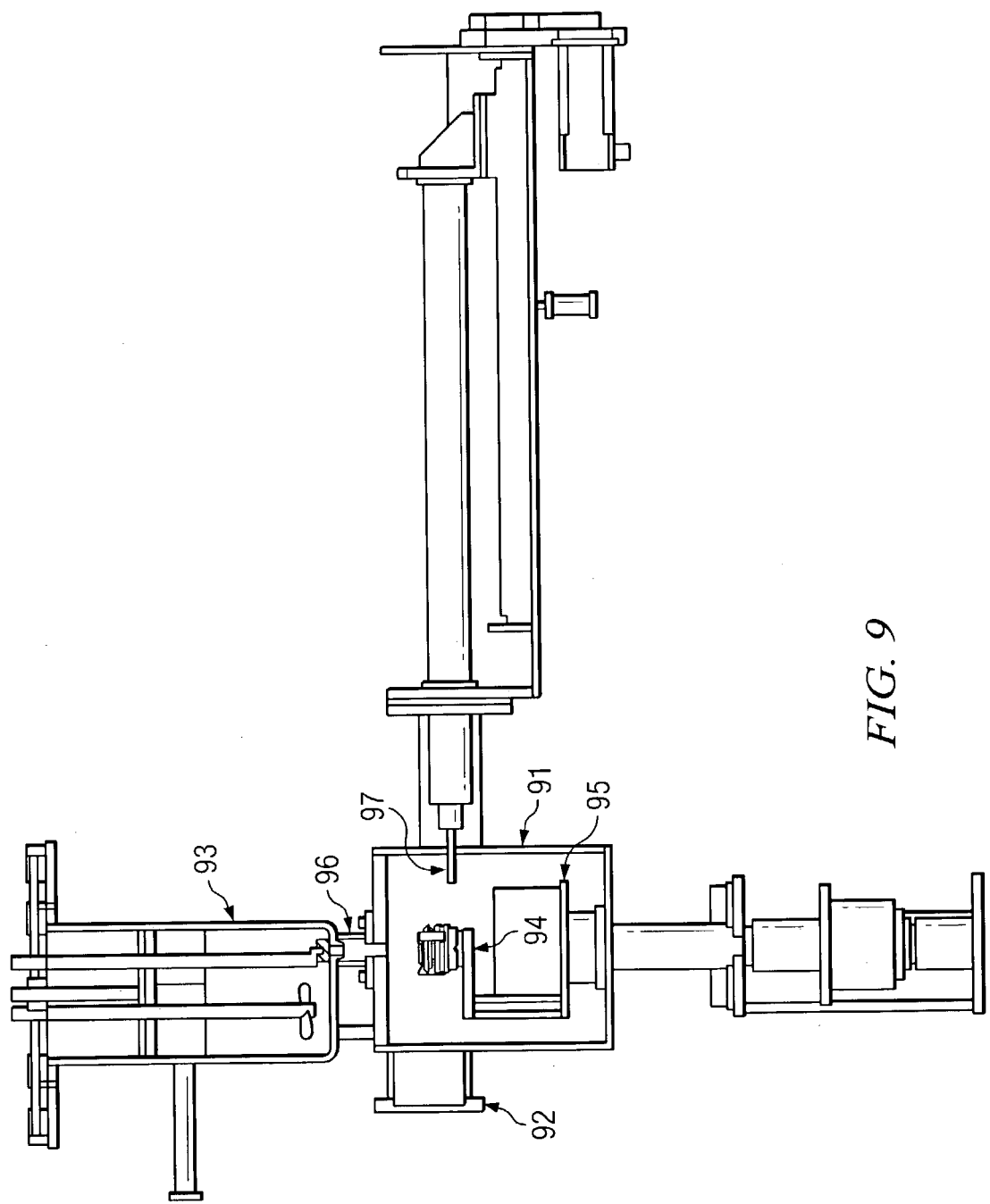
FIG. 9 illustrates a side view of a casting chamber used in an automated system for casting chalcogenide lenses.

FIG. 9 illustrates casting chamber 91, which may be used in a particular embodiment of an automated casting system. Empty molds are brought into casting chamber 91 by transport arm 97, which is operable to retrieve a single empty mold through pressure isolation valve 92. Once inside casting chamber 91, the empty mold is placed on casting tray 94. Casting tray 94 positions the empty mold beneath pour spout 96, through which liquid chalcogenide glass is dispensed into the empty mold from melt chamber 93, which is constructed similar to the device shown in FIG. 1. Like the casting chamber and mold chamber, pour spout 96 may also be heated. By constructing the entire automated casting system with externally-heated hot walls, there are fewer chances of localized hot/cold spots and less opportunities for materials to condense on the interior walls of the automated casting system.

Beneath casting tray 94 is dump tray 95. Dump tray 95 helps prevent any system damage due to casting failures. In the event of such a casting failure, dump tray 95 serves as a collection point for any excess chalcogenide glass, protecting the rest of the machine from the glass, which could potentially damage the machine and would require an extensive clean-up before any further production runs could be completed. The mold lift mechanism supports the mold during casting, and supports the dump tray. A loadcell within the lift mechanism senses changes in weight of the dumptray and the mold. The loadcell is used to measure the amount of glass dispensed into a mold. The loadcell is also used to measure the amount of glass dispensed during practice dispenses, into the dump tray before casting into molds. The dispense algorithm determines the amount of time the dispense valve is to be opened. The valve open time for the next dispense is adjusted based on analysis of the several previous dispense weights and times. The loadcell also senses any leakage from the melt chamber to allow early intervention.

Dump tray 95 is also useful in learning to dispense molten glass into the molds in casting chamber 91. As the viscosity of molten chalcogenide glass is very sensitive to temperature changes, the flow characteristics of the glass can change during casting. Therefore, it is often useful to practice and/or calibrate the dispensing of molten glass by pouring onto dump tray 95 instead of into a mold.

Figure 10:
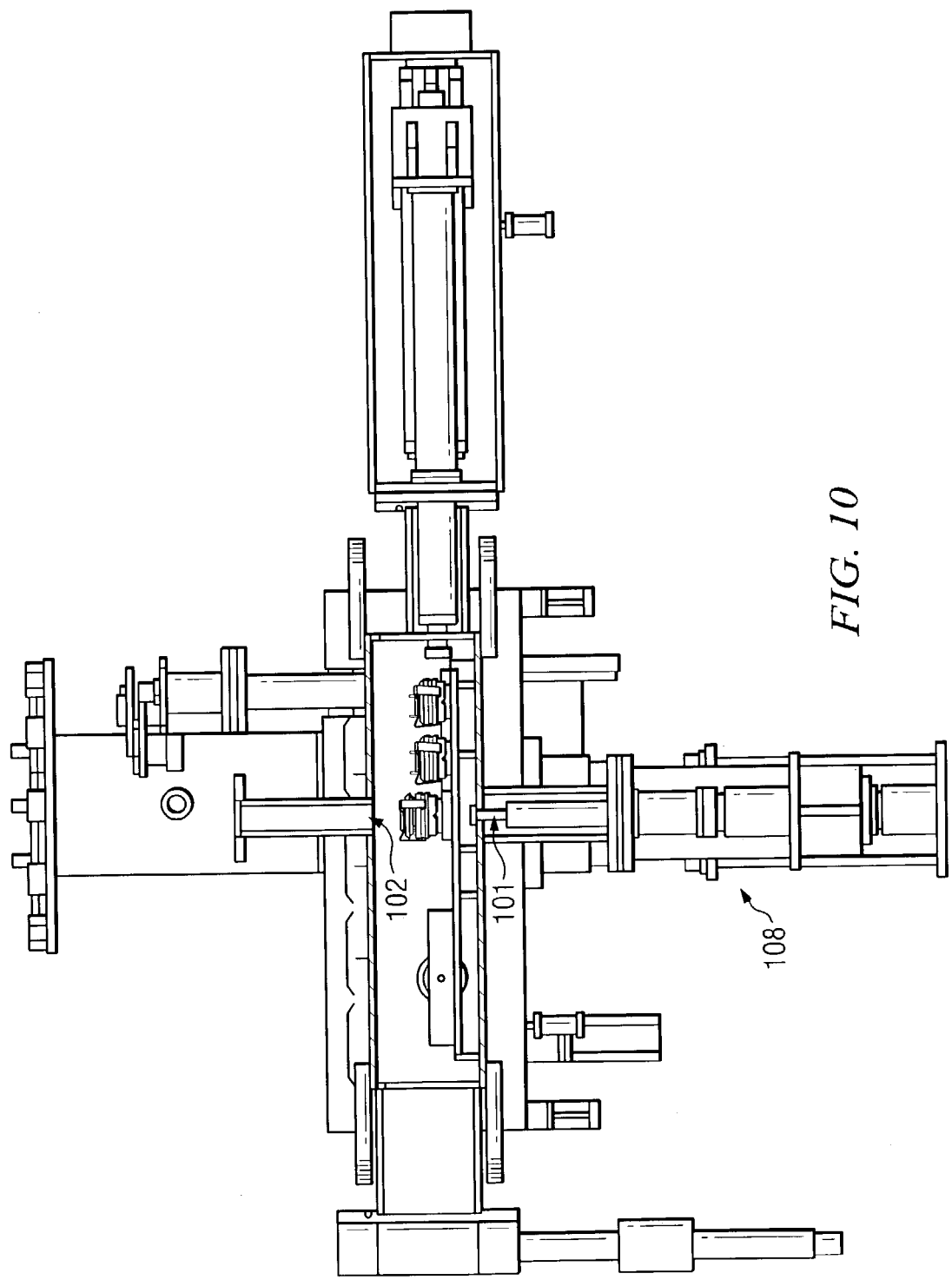
FIG. 10 illustrates a side view of a mold press used in an automated system for casting chalcogenide lenses.

As mentioned above, a mold press may be used to close the molds after casting. FIG. 10 illustrates such a mold press, mold press 108, used in an automated casting system. In mold press 108, mold press arm 101 engages the bottom of a mold that is to be closed and presses the open mold against mold press plate 102, forcing the mold into the closed position.

Figure 11:
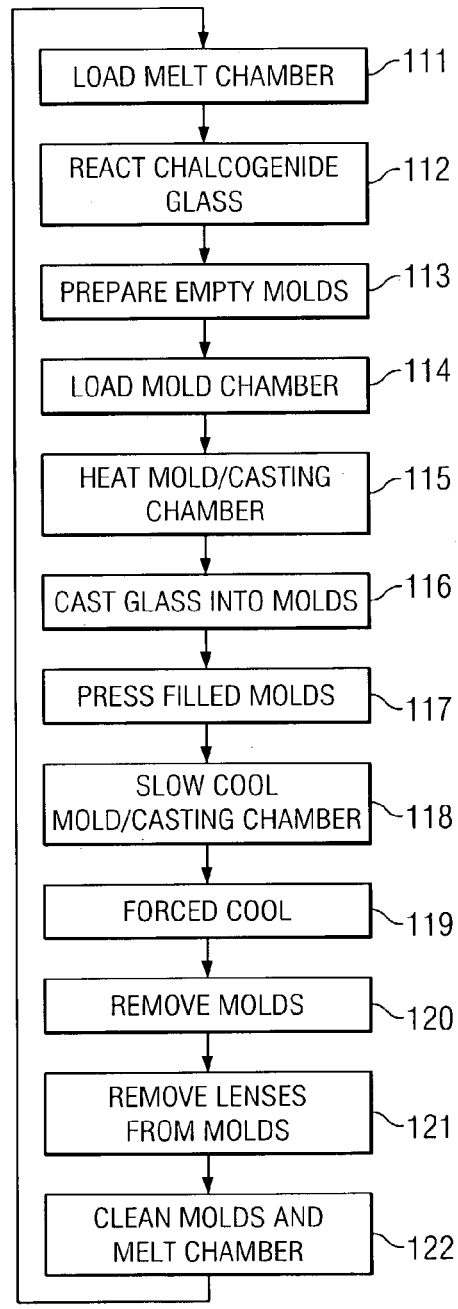
FIG. 11 illustrates a flowchart of a method for using an automated system for casting chalcogenide lenses.

A process for using an automated casting system similar to that shown in FIGS. 7–10 is illustrated in FIG. 11. In step 111, the melt chamber is loaded with the constituent elements of the chalcogenide glass being produced. These elements are reacted in step 112 to form liquid chalcogenide glass.

Empty molds are prepared in step 113, including coating the mold surfaces with a mold release compound. These prepared molds are then loaded into the mold chamber in step 114.

The mold chamber undergoes a vacuum bakeout at approx 100° C. and 3 mTorr to reduce the oxygen ($O_2$) and water vapor ($H_2O$) concentrations within the chamber to below 100 ppm and 500 ppm, respectively, and then the chamber and molds are heated to a temperature above the melting temperature of the chalcogenide glass, typically 300° C., all in step 115. Glass is then cast into the molds in step 116. After the molds have been filled with liquid chalcogenide glass, the molds are closed by the mold press in step 117.

Following pressing, the mold chamber and casting chamber are cooled in step 118, during which time the power to the heater is reduced, typically cooling the chamber to approximately 200° C. Cooling rates are controlled with heater power to minimize thermal stress on the hot wall chambers, and to reduce stress in the glass as it cools through the glass transition temperature. At lower temperatures (step 119) the cooling rate is accelerated by force cooling the heaters and mold chamber and casting chamber. In this process, forced air is blown between the heaters and the walls of the chambers to speed their cooling.

After the molds have adequately cooled, the molds are removed from the mold chamber in step 120, and the lenses are removed from the molds in step 121. Afterwards, the molds and melt chamber are cleaned in step 122, in preparation for another run when the production cycle restarts in step 111.

Although embodiments of the invention and their advantages are described in detail, a person skilled in the art could make various alternation, additions, and omissions without departing from the spirit and scope of the present invention as defined by the appended claims.

What is claimed is:

1. A method for the automated casting of infrared glass lenses, comprising:
   heating a mold in a mold chamber to a temperature near a melting temperature of infrared glass, the mold chamber being a first pressurized, heated enclosure having an interior;
   pouring molten liquid infrared glass into the mold while said mold is in an open position in a casting chamber, the casting chamber being a second pressurized, heated enclosure having an interior;
   closing said open mold on said molten liquid infrared glass; and
   cooling the mold to a temperature below the glass transition temperature of the infrared glass; and
   wherein the mold chamber and casting chamber are coupled together, providing a path of fluid communication between the interior of the mold chamber and the interior of the casting chamber.

2. The method of claim 1, wherein a pressure isolation valve couples the mold chamber and the casting chamber, and wherein the pressure isolation valve is operable to separate the interior of the mold chamber and the interior of the casting chamber.

3. The method of claim 2, further comprising transporting the mold between the interior of the mold chamber and the interior of the casting chamber through the pressure isolation valve.

4. The method of claim 3, wherein a transport arm is used to transport the mold between the interior of the mold chamber and the interior of the casting chamber.

5. The method of claim 1, further comprising reacting infrared glass constituents to form the molten infrared glass.

6. The method of claim 1, further comprising moving the mold around a closed loop within interior of the mold chamber.

7. The method of claim 6, wherein the mold is moved around the closed loop within the interior of the mold chamber by a plurality of mold pushers.

8. The method of claim 1, wherein the mold chamber is hot-walled.

9. The method of claim 8, wherein the mold chamber is externally heated.

10. The method of claim 1, wherein the casting chamber is hot-walled.

11. The method of claim 10, wherein the casting chamber is externally heated.

12. The method of claim 1, further comprising pressing the mold after the mold has been filled with the molten liquid infrared glass.

13. The method of claim 1, further comprising annealing the molten infrared glass after it has been poured into the mold.

14. A system for the automated casting of infrared glass lenses, comprising:
    a mold for casting infrared glass into lenses;
    a mold chamber operable to heat the mold to a temperature near a melting temperature of the infrared glass, the mold chamber being a first pressurized, heated enclosure having an interior; a casting chamber operable to fill the mold with molten infrared glass, the casting chamber being a second pressurized, heated enclosure having an interior; and
    wherein the mold chamber and casting chamber are coupled together, providing a path of fluid communication between the interior of the mold chamber and the interior of the casting chamber; and
    wherein said system further comprises:
    a pressure isolation valve operable to separate the interior of the mold chamber and the interior of the casting chamber; and wherein the pressure isolation valve couples the mold chamber and the casting chamber.

15. The system of claim 14, further comprising a valve configured to dispense said molten infrared glass into said mold; and wherein said automated system is configured to determine and control the time that said valve is opened to dispense said molten infrared glass into said mold based on a measured weight of molten infrared glass dispensed into said mold.

16. The system of claim 14, further comprising a valve configured to dispense said molten infrared glass into said mold; and wherein said automated system is further configured to adjust the time that said valve is opened to dispense said molten infrared glass into said mold based on analysis of previous dispense weights and times.

17. The system of claim 14, further comprising: a melt chamber coupled with the casting chamber; and wherein the melt chamber is operable to heat the infrared glass to a molten state and dispense the infrared glass to the casting chamber for casting into the mold.

18. The system of claim 17, wherein the melt chamber is further operable to react infrared glass constituents to form the infrared glass.

19. The system of claim 14, wherein the mold travels around a closed loop within the interior of the mold chamber.

20. The system of claim 19, further comprising: a plurality of mold pushers disposed within the interior of the mold chamber; and wherein the mold pushers are operable to move the mold around the closed loop within the interior of the mold chamber.

21. The system of claim 14, further comprising: a mold press disposed within the interior of the mold chamber; and wherein the mold press is operable to press the mold closed once the mold has been filled with the molten infrared glass.

22. The system of claim 14, wherein the mold chamber is hot-walled.

23. The system of claim 22, wherein the mold chamber is externally heated.

24. The system of claim 14, wherein the casting chamber is hot-walled.

25. The system of claim 24, wherein the casting chamber is externally heated.

26. The system of claim 14, further comprising: a transport arm; and wherein the transport arm is operable to transport the mold between the mold chamber and the casting chamber.

27. The system of claim 14, further comprising: a dump tray disposed within the casting chamber; and wherein the dump tray is operable to collect excess infrared glass dispensed in the casting chamber.

28. A method for the automated casting of infrared glass lenses, comprising:
heating a mold in a mold chamber to a temperature near a melting temperature of infrared glass, the mold chamber being a first pressurized, heated enclosure having an interior; casting molten infrared glass into the mold in a casting chamber, the casting chamber being a second pressurized, heated enclosure having an interior; and
cooling the mold to a temperature below the glass transition temperature of the infrared glass; and
wherein the mold chamber and casting chamber are coupled together, providing a path of fluid communication between the interior of the mold chamber and the interior of the casting chamber; and
wherein a pressure isolation valve couples the mold chamber and the casting chamber, and wherein the pressure isolation valve is operable to separate the interior of the mold chamber and the interior of the casting chamber.

29. The method of claim 28, further comprising transporting the mold between the interior of the mold chamber and the interior of the casting chamber through the pressure isolation valve.

30. The method of claim 29, wherein a transport arm is used to transport the mold between the interior of the mold chamber and the interior of the casting chamber.

31. A method for the automated casting of infrared glass lenses, comprising:
heating a mold in mold chamber to a temperature near a melting temperature of infrared glass, the mold chamber being a first pressurized, heated enclosure having an interior;
casting molten infrared glass into the mold in a casting chamber and controlling the amount of molten infrared glass dispensed into said mold based on a measured weight of molten infrared glass dispensed into said mold, the casting chamber being a second pressurized, heated enclosure having an interior; and
cooling the mold to a temperature below the glass transition temperature of the infrared glass;
wherein the mold chamber and casting chamber are coupled together, providing a path of fluid communication between the interior of the mold chamber and the interior of the casting chamber.

32. The method of claim 31, further comprising determining and controlling the amount of molten infrared glass dispensed into said mold based on a measured weight of molten infrared glass dispensed into said mold.

33. The method of claim 31, further comprising adjusting the amount of molten infrared glass dispensed into said mold based on analysis of previous dispense weights and times.

* * * * *